3,073,534
NOZZLE FOR SPRAYING A MIXTURE OF
           FIBERS AND RESIN
William J. Hampshire, Cuyahoga Falls, Ohio, assignor to
  Goodyear Aircraft Corporation, Akron, Ohio, a corporation of Delaware
         Filed May 27, 1960, Ser. No. 32,317
               3 Claims. (Cl. 239—422)

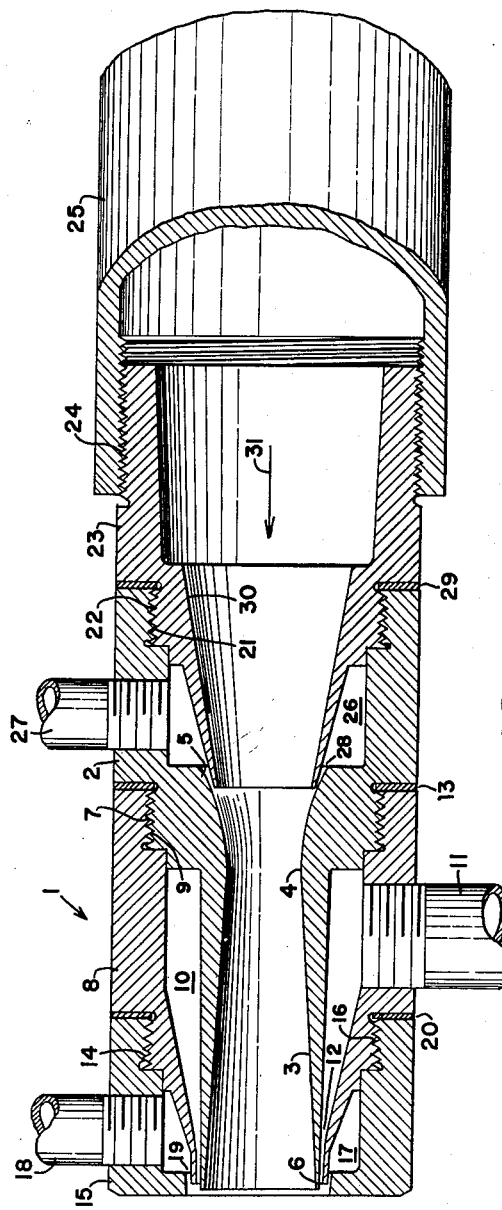

This invention relates to nozzles for spraying a mixture of fibers and liquid resin by means of compressed air.

It is a general object of the invention to provide an improved relatively inexpensive, long-lived, and efficient nozzle for spraying fibers and resins which can be used for long periods of time without the nozzle clogging and which provides a very uniform and even mixture of resin and fibers on the form or mold against which the fibers and resin are directed by the nozzle.

Another object of the invention is the provision of a nozzle which is relatively light in weight and small in size so that it is readily portable, and which is easily manufactured and maintained.

The foregoing objects of the invention, and other objects which will become apparent as the description proceeds, are achieved by the provision of a nozzle assembly for discharging a mixture of air, resin and fibers which assembly includes a body portion having an internal passage formed with a venturi throat, means for supplying a completely circular thin layer of air under pressure in a downstream direction to the venturi throat just upstream from the smallest dimension of the throat and substantially tangent to the throat, means for supplying a completely circular thin layer of liquid resin under pressure in a downstream direction to the venturi throat at the discharge end of the throat and slightly inwardly of the axis of the throat, means for supplying a completely circular thin layer of air under pressure in a downstream direction to substantially surround the layer of discharged resin, said means directing the air slightly inwardly towards the axis of the throat, and means adapted to connect a conduit carrying a mixture of air and fibers to the upstream end of the body portion.

For a better understanding of the invention reference should be had to the single FIGURE of the drawings which comprises a longitudinal vertical cross-sectional view through a nozzle incorporating the principles of the invention.

In the drawings, the numeral 1 indicates generally the nozzle of the invention and comprising a body portion or sleeve member 2 having an internal axial bore 3 in the shape of a venturi throat which has a smallest diameter at 4, an upstream end at 5, and a thin feathered downstream end at 6.

The sleeve member 2 is externally threaded at 7 so that a ring member 8 internally threaded at 9 can be screwed onto the thread 7, and with a resin-receiving chamber 10 being formed between the sleeve member 2 and the ring member 8 in the manner illustrated. Liquid resin, usually under pressure, is supplied to the resin chamber 10 by means of a flexible conduit 11. The resin chamber 10 has a thin conical opening 12 directed slightly inwardly and downstream toward the axis of the venturi passage and surrounding the downstream end 6 of the sleeve member 2. The opening 12 has a radial dimension of .020 inch plus or minus .002 inch, in a typical embodiment of the nozzle, and the placement of shims 13 of different thickness at the shoulder joint between the sleeve member 2 and the ring member 8 allows the radial clearance of openings 12 to be adjusted.

The ring member 8 is externally threaded at 14 to receive a cap member 15 which is internally threaded at 16 for screwing on the threads 14. The cap member 15 forms with the ring member 8 an air chamber 17 to which air under pressure is applied by way of a flexible conduit 18. The air chamber 17 has a conical discharge opening 19 surrounding the conical opening 12 of the resin chamber 10 and directed downstream and slightly inward towards the axis of the venturi passage. The cap member 15, ring member 8, and sleeve member 2 all terminate substantially flush with the downstream end of the sleeve member 2. The opening 19 of the air chamber 17 has a radial dimension of .005 inch plus or minus .001 inch in a typical embodiment of the apparatus, and by placing shims 20 of different thickness at the shoulder between the sleeve member 2 and the cap member 15, the radial dimension of the opening 19 can be adjusted.

The upstream end of the sleeve member 2 is internally threaded at 21 to have threaded engagement with the externally threaded portion 22 of a coupling member 23 having its upstream end externally threaded at 24 to removably receive a conduit 25 adapted to deliver a mixture of air and cut fibers (not shown) to the nozzle 1.

The coupling member 23 together with the sleeve member 2 defines an air chamber 26 adapted to be supplied air under pressure by a flexible conduit 27. The air chamber 26 has an opening 28 for supplying a thin conical layer of air under pressure adjacent the upstream end 5 of the venturi passage 3, and just a short distance upstream from the smallest dimension 4 of the venturi passage. The thin conical layer of air under pressure passing out of the opening 28 is directed in a downstream direction and slightly inward towards the axis of the venturi passage and in a direction substantially tangent to the surface of the venturi passage. The radial dimension of the opening 28 in a typical embodiment of the apparatus is .009 inch plus or minus .001 inch, and by placing shims 29 of different thickness at the shoulder between the coupling member 23 and the sleeve member 2 the rdial distance of the opening 28 can be adjusted.

It will be noted that the coupling member 23 is formed with a conical bore 30 of a diameter reducing in a downstream direction with the bore 30 forming, in effect, an upstream continuation of the venturi passage 3 so that the mixture of air and fibers moving in the direction shown by the arrow 31 is reduced in diameter in passing through the narrowest portion 4 of the venturi throat but is materially speeded up in velocity in accord with the well known venturi principle. The high pressure air escaping through the opening 28 from air passage 26 further increases the speed and velocity of throw, as well as assisting in keeping the venturi throat free from fibers in use.

The application of the liquid resin from the chamber 10 to the high velocity air stream containing the fibers at a point at the discharge end 6 of the venturi passage 3 means that the liquid resin is not mixed with the fibers until after they have left the end of the gun, and this has been found to prevent any buildup of resin and fibers in the nozzle itself. The inwardly directed compressed air passing out opening 19 serves to initially compact the resin and fibers into a particularly narrow and high velocity stream so that the nozzle can be used to direct this stream against a form or mold at a reasonable distance and with a desired force for proper deposit of the resin and fibers on the form or mold. By keeping the conduits 11, 18, 27 and 25 relatively light and flexible the entire nozzle assembly is readily portable and easily handled by an operator for long periods without fatigue.

While a certain representative embodiment and details have been shown for the purpose of illustrating the invention, it will be apparent to those skilled in this art that various changes and modifications may be made therein without departing from the spirit or scope of the invention.

What is claimed is:

1. A nozzle assembly for discharging a mixture of air, resin and fibers which assembly includes a body portion having an internal passage formed with a venturi throat, means for supplying a completely circular thin layer of air under pressure in a downstream direction to the venturi throat just upstream from the smallest dimension of the throat and substantially tangent to the throat, means for supplying a completely circular thin layer of liquid resin under pressure in a downstream direction to the venturi throat at the discharge end of the throat and slightly inwardly of the axis of the throat, means for supplying a completely circular thin layer of air under pressure in a downstream direction to substantially surround the layer of discharged resin, said means directing the air slightly inwardly towards the axis of the throat, and means adapted to connect a conduit carrying a mixture of air and fibers to the upstream end of the body portion.

2. A nozzle assembly for discharging a mixture of air, resin and fibers which assembly includes a body portion having an internal passage formed with a venturi throat, means for supplying a completely circular thin layer of air under pressure in a downstream direction to the venturi throat just upstream from the smallest dimension of the throat, means for supplying a completely circular thin layer of liquid resin under pressure in a downstream direction to the venturi throat substantially at the discharge end of the throat, means for supplying a completely circular thin layer of air under pressure in a downstream direction to substantially surround the layer of discharged resin, and means adapted to connect a conduit carrying a mixture of air and fibers to the upstream end of the body portion.

3. The combination in a nozzle of a sleeve member having an internal passage formed with a venturi throat, a ring member screwed onto the sleeve member to define a resin chamber between the members, the resin chamber having a conical opening directed slightly inward and downstream toward the axis of the internal passage and surrounding the downstream end of the venturi throat, a cap member screwed onto the ring member and defining with the ring member an air chamber, the air chamber having a conical opening surrounding the conical opening of the resin chamber and directed downstream and slightly inward toward the axis of the internal passage, the cap member, ring member, and sleeve member all terminating substantially flush with the downstream end of the sleeve member, a coupling member having a screw threaded end adapted to removably receive a conduit for carrying a mixture of air and fibers, the coupling member being threaded to the inside of the upstream end of the sleeve member to define an air chamber, the air chamber having a conical opening directed downstream and slightly inwardly of the axis of the internal passage and positioned just upstream from the smallest dimension of the venturi throat, the coupling member having an internal bore of conical shape reducing in diameter in the downstream direction, the coupling member terminating in the downstream direction adjacent the conical opening of the air chamber, means for supplying resin under pressure to the resin chamber, and means for supplying air under pressure to the air chambers.

References Cited in the file of this patent
UNITED STATES PATENTS

| | | |
|---|---|---|
| 2,391,422 | Jackson | Dec. 25, 1945 |
| 2,919,836 | Limpert | Jan. 5, 1960 |
| 2,929,436 | Hampshire | Mar. 22, 1960 |